United States Patent [19]

McMahan

[11] 4,412,447
[45] Nov. 1, 1983

[54] DISPOSABLE IRRIGATION GAUGE

[76] Inventor: Walter C. McMahan, Rte. 6, Box 2115, Escondido, Calif. 92025

[21] Appl. No.: 286,177

[22] Filed: Jul. 23, 1981

[51] Int. Cl.³ ............................................. G01F 23/02
[52] U.S. Cl. ...................................... 73/73; 116/227; 116/321
[58] Field of Search .......................... 73/73, 338, 171; 119/77; 239/39, 35, 71; 116/69, 227; 137/453

[56] References Cited

U.S. PATENT DOCUMENTS

| | | | |
|---|---|---|---|
| 1,330,995 | 2/1920 | Wyman | 119/77 |
| 1,851,278 | 3/1932 | Hearn | 119/77 |
| 2,878,671 | 3/1959 | Prosser et al. | 73/73 |
| 3,048,032 | 8/1962 | Winter | 73/73 |
| 3,443,420 | 5/1969 | McMahan | 73/73 |
| 3,926,143 | 12/1975 | Hothan | 73/73 X |
| 4,055,991 | 11/1977 | Bridwell | 73/73 |

Primary Examiner—Charles A. Ruehl
Assistant Examiner—J. Chapman
Attorney, Agent, or Firm—Flam & Flam

[57] ABSTRACT

An inverted tube closely fits a supporting cup and contains a column of water. A substantially annular or ring-like space is formed between the cup and the tube. Water is fed to the annular space through a lateral opening in the tube, the upper edge of the opening being located just below the level of the cup rim. As water evaporates from the exposed ring of water, it is replaced by the inverted column, air being admitted through the tube opening. Evaporation and transpiration causes reduction of the water level thus to indicate the amount of moisture loss from the surrounding soil.

3 Claims, 5 Drawing Figures

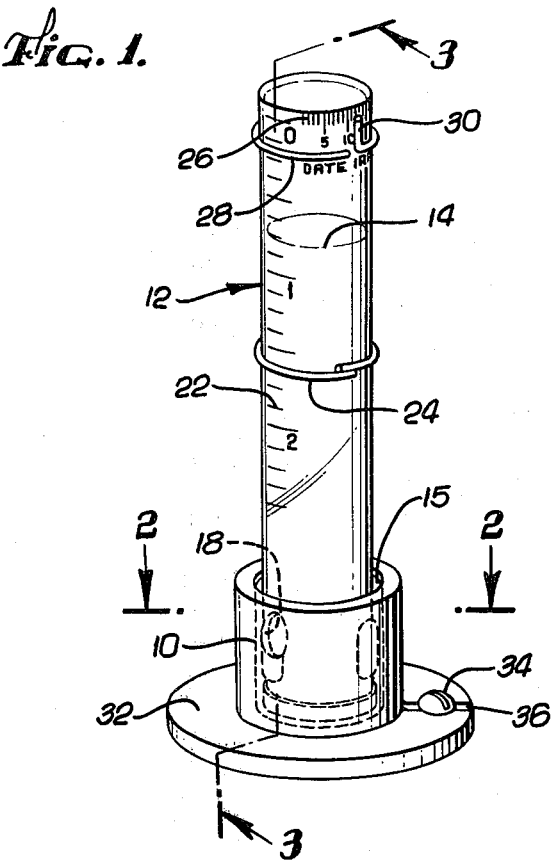
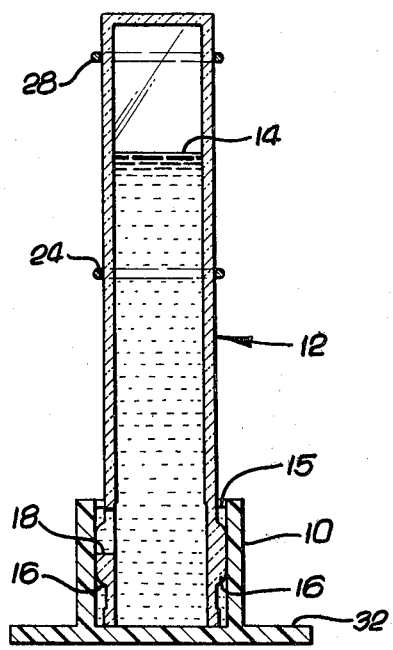
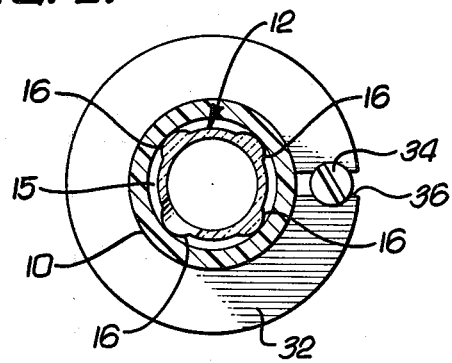
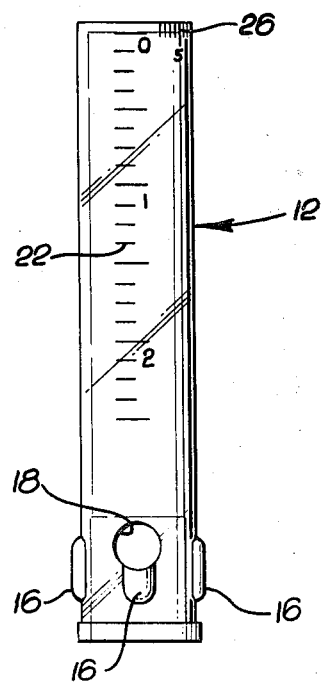
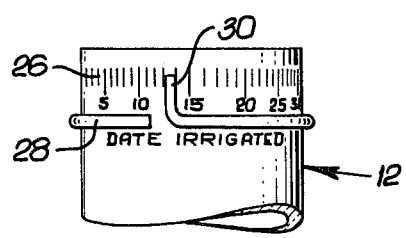

DISPOSABLE IRRIGATION GAUGE

FIELD OF INVENTION

This invention relates to apparatus for assisting in the efficient utilization of irrigation water. A gauge for such purpose is shown and described in my U.S.A. Pat. No. 3,443,420 issued May 13, 1969 entitled IRRIGATION GAUGE.

BACKGROUND OF THE INVENTION

Various known moisture gauges are indeed scientific marvels. The problem, however, is that such moisture gauges are too delicate to withstand the hard knocks of the environment, or too complicated to be serviced or understood by field personnel. The basic object of the present invention is to provide an irrigation gauge that is extremely simple in construction and operation. More particularly, an object of this invention is to improve upon the structure of my U.S.A. Pat. No. 3,443,420.

In my prior patent, there is disclosed a laterally exposed wick that releases moisture in roughly the same manner that moisture is released from the soil, and as a function of wind, humidity, intensity and duration of sunshine, temperature, etc. Accordingly, the height of the reservoir from which the wick draws roughly indicates the moisture condition of the adjacent soil. The wick itself deteriorates; it's capillary action is not independent of the height of the water in its reservoir; it is easily dislodged.

SUMMARY OF INVENTION

My new gauge exposes a fixed small area of water to the elements for it to be acted upon by the elements, and which area is independent of the quantity of water remaining in the reservoir. This is done without a wick. In particular, an inverted tube closely fits a supporting cup and contains a column of water. A substantially annular or ring-like space is formed between the cup and the tube. Water is fed to the annular space through a lateral opening in the tube, the upper edge of the opening being located just below the level of the cup rim. As water evaporates from the exposed ring of water, it is replaced by the inverted column, air being admitted through the tube opening. The cup has an attachment flange having means whereby it is releasably anchored to a support.

BRIEF DESCRIPTION OF THE DRAWINGS

A detailed description of the invention will be made with reference to the accompanying drawings wherein like numerals designate corresponding parts in the several figures. These drawings are to scale.

FIG. 1 is a pictorial view of the irrigation gauge.

FIG. 2 is a transverse sectional view taken along a plane corresponding to line 2—2 of FIG. 1.

FIG. 3 is a longitudinal sectional view taken along a plane corresponding to line 3—3 of FIG. 1.

FIG. 4 is a front elevational view of the tube part of the gauge.

FIG. 5 is a fragmentary side elevational view of the top of the tube part of the gauge.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, since the scope of the invention is best defined by the appended claims.

The gauge shown in FIG. 1 comprises two parts, a supporting cup 10 and an inverted hollow tube 12 closed at its upper end. These parts may be made of molded plastic. The tube is translucent. The lower open end of the tube is frictionally fitted into the cup 10. The tube 12, while originally filled with water at the time of the last field irrigation, is depicted in FIG. 1 as only partially filled. The water has dropped to a level 14 as a result of the action of the environmental elements on the gauge.

The cup 10 and the tube 12 provide an annular space 15 at which water of the tube 12 is exposed for processes of evaporation and transpiration to take place. This annular space is carefully defined by making the inside diameter of the cup 10 just slightly larger than the outside diameter of the tube 12 and by maintaining the cup and tube in registry with each other. In order to maintain such registry, the lower end of the tube 12 has four equiangularly spaced protuberances 16 frictionally engaging the walls of the cup 10. The protuberances 16 determine a coaxial relationship of the cup 10 and the tube 12. In practice, the inside diameter of the cup 10 may be about ⅞", and the outside diameter of the tube 12 may be ¾", thus providing an annular space about 1/16" wide.

Water communicates between the tube 12 and the annular space via a lateral opening 18. The upper edge of the opening 18 lies just below the level of the cup rim 20 when the tube 12 is bottomed into the cup 10. As water evaporates or transpires from the annular region, the upper edge of the opening 18 provides access for passage of air into the tube, allowing the water to drop, thereby replenishing the annular region and reclosing the opening 18. By this "chicken feeder" principle, the water level is maintained whatever the level of water may be in the tube 12 until, of course, the reservoir is exhausted.

The gauge, originally filled with water in a manner hereinafter described, is positioned in the field so as to be exposed to the sun, wind and other environmental elements in the same manner as is the agricultural field itself. Water transpires and evaporates from the gauge at a rate generally proportional to the rate that water is lost from the adjacent field due to the same causes. Thus, the level of water in the tube 12 reflects the moisture content of the field. This informaion can be used in two ways. If the field is irrigated on a fixed period basis, then the gauge level may be used to determine how much water should be used to irrigate, as by setting a timer. If irrigation is done when the field loses moisture, then the gauge may be used to determine when irrigation is needed. Two different scales are provided to assist these functions. One scale comprises a series of spaced horizontal markings 22 cooperable with the water level to indicate the amount of moisture lost or the moisture content of the soil. A friction wire 24 slidable along the outside of the tube may be placed at a position to signal the necessity for irrigation.

Another scale comprises a series of spaced vertical markings 26 at the closed top of the tube 12. A friction wire 28 has a bent end 30 cooperable with the markings 26 to indicate the day of the month when irrigation is next scheduled. When the field is irrigated, the gauge is reset. For this purpose, the tube 12 is filled and the cup 10 is placed over it. Thereupon, both are turned upside down. The water level is then at the top of the tube 12.

The cup 10 has a base or flange 32 which can be releasably secured at the gauge station. The gauge station may comprise a support or platform a few feet above ground level. A screw 34 cooperates with a peripheral slot 36 in the flange 32 and is tightened just enough to secure the gauge in place while allowing it to be deliberately removed.

The gauge is extremely simple and sturdy. Yet it is so inexpensive, that it may be considered disposable. Despite its low cost and simplicity, it is a valuable and quite accurate tool for ranch and farm management.

Intending to claim all novel, useful and unobvious features shown or described, I make the following claims:

1. An irrigation gauge for use in an agricultural field comprising:
   (a) a cup having a rim;
   (b) a hollow translucent tube for containing water, said tube being closed at one end and open at the other end;
   (c) means determining a fitted relationship between the cup and the open end of the tube;
   (d) said tube and cup determining a space between them at the region of the cup rim for containing water exposed to the environment,
   (e) said hollow tube having a lateral opening providing access for passage of air into the tube and allowing water in the tube to drop, thereby replenishing said space upon evaporation and/or transpiration of water therefrom;
   (f) means cooperable with the change in the level of water in the tube to indicate the amount of moisture loss in the field.

2. The irrigation gauge set forth in claim 1 together with means for releasably clamping said cup to a supporting structure.

3. An irrigation gauge for use in an agricultural field comprising:
   (a) a cup extending from a base, said cup having a rim;
   (b) a hollow translucent tube for containing water, said tube being closed at one end and open at the other end;
   (c) said tube having, at its open end, a series of substantially equiangularly spaced protuberances extending radially outwardly and sized to provide a friction fit between the inside of the cup and the lower end of the tube, thereby to determine a substantially annular space between the cup rim and the tube containing water exposed to the environment;
   (d) said tube having a lateral opening, the upper edge of which is at or below the level of the cup rim when the tube is seated in the cup, said opening providing access for passage of air into the tube and allowing water in the tube to drop, thereby replenishing water to said annular space upon transpiration or evaporation therefrom;
   (e) said base having a slot cooperable with a screw for releasably clamping the cup to a supporting structure,
   (f) means cooperable with the change in the level of water in the tube to indicate the amount of moisture loss in the field.

* * * * *